United States Patent
Ito et al.

(10) Patent No.: US 7,126,402 B2
(45) Date of Patent: Oct. 24, 2006

(54) SIGNAL GENERATION APPARATUS FOR SUPPLYING TIMING SIGNAL TO SOLID STATE DEVICE

(75) Inventors: Masanobu Ito, Fukuoka (JP); Koichi Tsutamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 25 days.

(21) Appl. No.: 10/963,246

(22) Filed: Oct. 12, 2004

(65) Prior Publication Data

US 2005/0083094 A1    Apr. 21, 2005

(30) Foreign Application Priority Data

Oct. 15, 2003  (JP) .......................... P2003-354509

(51) Int. Cl.
*G06F 1/04*        (2006.01)
(52) U.S. Cl. ..................... 327/291; 327/292; 327/295
(58) Field of Classification Search ................ None
See application file for complete search history.

(56) References Cited

U.S. PATENT DOCUMENTS

| | | | | |
|---|---|---|---|---|
| 5,486,868 A | * | 1/1996 | Shyu et al. ................. | 348/524 |
| 5,771,040 A | * | 6/1998 | Kim ........................... | 345/213 |
| 6,285,399 B1 | * | 9/2001 | Tao ............................ | 348/312 |
| 6,873,365 B1 | * | 3/2005 | Sasaki ........................ | 348/312 |
| 6,873,366 B1 | * | 3/2005 | Tashiro et al. .............. | 348/312 |
| 2005/0012822 A1 | * | 1/2005 | Takeda et al. ......... | 348/207.99 |

* cited by examiner

*Primary Examiner*—Timothy P. Callahan
*Assistant Examiner*—Khareem E. Almo
(74) *Attorney, Agent, or Firm*—Sonnenschein Nath & Rosenthal LLP

(57) ABSTRACT

A timing generator capable of improving design efficiency by facilitating adaptation to change in design. The timing generator has work area 9 which outputs parameters in response to control data, and main core 12 to which the parameters are inputted. In the work area, V and H parameters are described. The main core consists of third comparator 11 for comparing a count value of V counter 10 with V parameter and outputting a first control pulse, first comparator 1 for comparing a count value of H counter 3 with H parameter and outputting a second control pulse, second comparator 4 for comparing a count value of high speed counter 8 with H parameter and outputting a third control pulse, first selector 2 for selecting the second control data or the third control data, and first JK flip flop 5 for generating a timing signal from output of the first selector.

2 Claims, 2 Drawing Sheets

SIGNAL GENERATION APPARATUS FOR SUPPLYING TIMING SIGNAL TO SOLID STATE DEVICE

CROSS REFERENCE TO RELATED APPLICATION

This application claims priority from Japanese Priority Application No. 2003-354509, filed on Oct. 15, 2003 with the Japanese Patent Office, the entire content of which is hereby incorporated by reference.

BACKGROUND OF THE INVENTION

1. Field of the Invention

The present invention relates to a timing signal generation apparatus and, in particular, it relates to a timing signal generation apparatus for supplying a timing signal to a solid-state image pick-up device in accordance with set-up information thereof.

2. Description of Related Art

A solid-state image pick-up device such as a video camera and a digital still camera using a solid-state image pick-up element such as a CCD is generally known. Such a solid-state image pick-up device is provided with a control circuit for systematically controlling respective functions of an image pick-up section, a signal processor section, a record processor section and the like, and further with a timing signal generation apparatus, i.e., a so-called timing generator, for generating a timing signal which specifies an operating timing of respective sections.

In the following, a conventional timing generator will be described by referring to the accompanying drawing. FIG. 2 is a schematic block diagram showing a conventional timing generator. In this timing generator shown here, from a count value of a V counter 101 which starts counting as triggered by a vertical synchronizing signal VD and also using a horizontal synchronizing signal HD as a clock, a third decoder 102 generates a decode value of a difference in timing for each vertical transfer mode so as to generate a timing pulse. The timing pulse from the third decoder is selected in response to a control data from a microcomputer (hereinafter referred to as a microcom), and is outputted as a leading edge pulse and/or a trailing edge pulse from a second selector 103. The leading edge pulse and/or the trailing edge pulse outputted from the second selector are outputted via a second JK flip flop 104 as a mask signal of a vertical period. Further, from a count value of an H counter 105 which carries out counting as triggered by a horizontal synchronizing signal HD and also using a master clock signal MCK as a clock at the times of a normal transfer and/or a charge read-out transfer in a vertical transfer mode, a first decoder 106 generates a decode value of a change in timing in the normal transfer and/or the charge read-out transfer in the vertical transfer mode so as to generate a timing pulse therefor. Likewise, from a count value of a high speed counter 107 which carries out counting triggered by a horizontal synchronizing signal HD and also using a master clock signal MCK as a clock at the times of a fast sweep out transfer and a frame shift transfer in a vertical transfer mode, a second decoder 108 generates a decode value of a change in timing in the fast sweep out transfer and the frame shift transfer so as to generate a timing pulse therefor. Timing pulses from the first decoder and the second decoder are selected in response to a control data from the microcomputer, and outputted from a first selector 109 as a leading edge pulse and/or a trailing edge pulse which were masked with the mask signal for the vertical period which was generated by the second JK flip flop as described above. The masked leading edge pulse and/or trailing edge pulse outputted from the first selector are outputted from a first JK flip flop 110 as timing signals XV 1~4, XSG 1~2 of the solid-state image pick-up device.

SUMMARY OF THE INVENTION

Nowadays, the period of time for the development of solid-state image pick-up devices is becoming substantially shortened and the price thereof is decreasing, while on the other hand, various endeavors for increasing the number of pixels and improving the performance of the solid-state image pick-up devices are under way, and when any improved solid-state image pick-up device is realized, generally its driving timing is not interchangeable with the others.

However, according to the aforementioned conventional timing generator, because that the decode values thereof are generated directly from the various counters (the V counter, the H counter and the high speed counter), in the case when incorporating those timing pulses in a multiple number and having complicated waveforms into the decoder circuits for use of operation of the solid-state image pick-up device, it has been difficult to modify in compliance with a change if it occurs due to complications in the description of the hardware description language and/or in the gate level circuits therefor.

The present invention is contemplated in view of the above-mentioned problem associated with the conventional device. An object of the present invention is therefore to provide a novel timing signal generation apparatus capable of improving the design efficiency by facilitating adaptation to a change in the design.

In order to accomplish the aforementioned object, a novel timing signal generation apparatus is provided according to an aspect of the present invention, which has a work area from which parameters are outputted in response to a control data, and a main core to which said parameters are inputted, wherein into the aforementioned work area, a first parameter and a second parameter are described, and wherein the aforementioned main core comprises: a first counter for counting a reference clock as triggered by each pulse of a vertical synchronizing signal; a second counter for counting a reference clock as triggered by each pulse of a horizontal synchronizing signal at the time of a first drive mode; a third counter for counting a reference clock as triggered by each pulse of a horizontal synchronizing signal at the time of a second drive mode; a first comparator for comparing a count value in the first counter with the first parameter and outputting a first control pulse in accordance with the count value of the first counter; a second comparator for comparing a count value in the second counter with the second parameter and outputting a second control pulse in accordance with the count value of the second counter; a third comparator for comparing a count value in the third counter with the second parameter and outputting a third control pulse in accordance with the count value of the third counter; and an output means for selectively outputting the second control pulse or the third control pulse in response to a control data supplied from external.

Here, if a change in the driving timing occurs, by referring to the work area in which a numeric data indicating a changing point in the timing signal is described, a modification point thereof is clarified. Further, advantageously by the main core which is standardized in a hardware description language level, it is enabled to deal with any change in the driving timing, if it occurs, with a minimal level of modifications.

According to the timing signal generation apparatus embodying the present invention, even if there arises a change in the driving timing thereof, a modification therefor can be readily implemented, thereby enabling to improve the design efficiency.

Further features of the invention, and the advantages offered thereby, are explained in detail hereinafter, in reference to specific embodiments of the invention illustrated in the accompanying drawings.

DESCRIPTION OF THE PREFERRED EMBODIMENT

Figure 1:
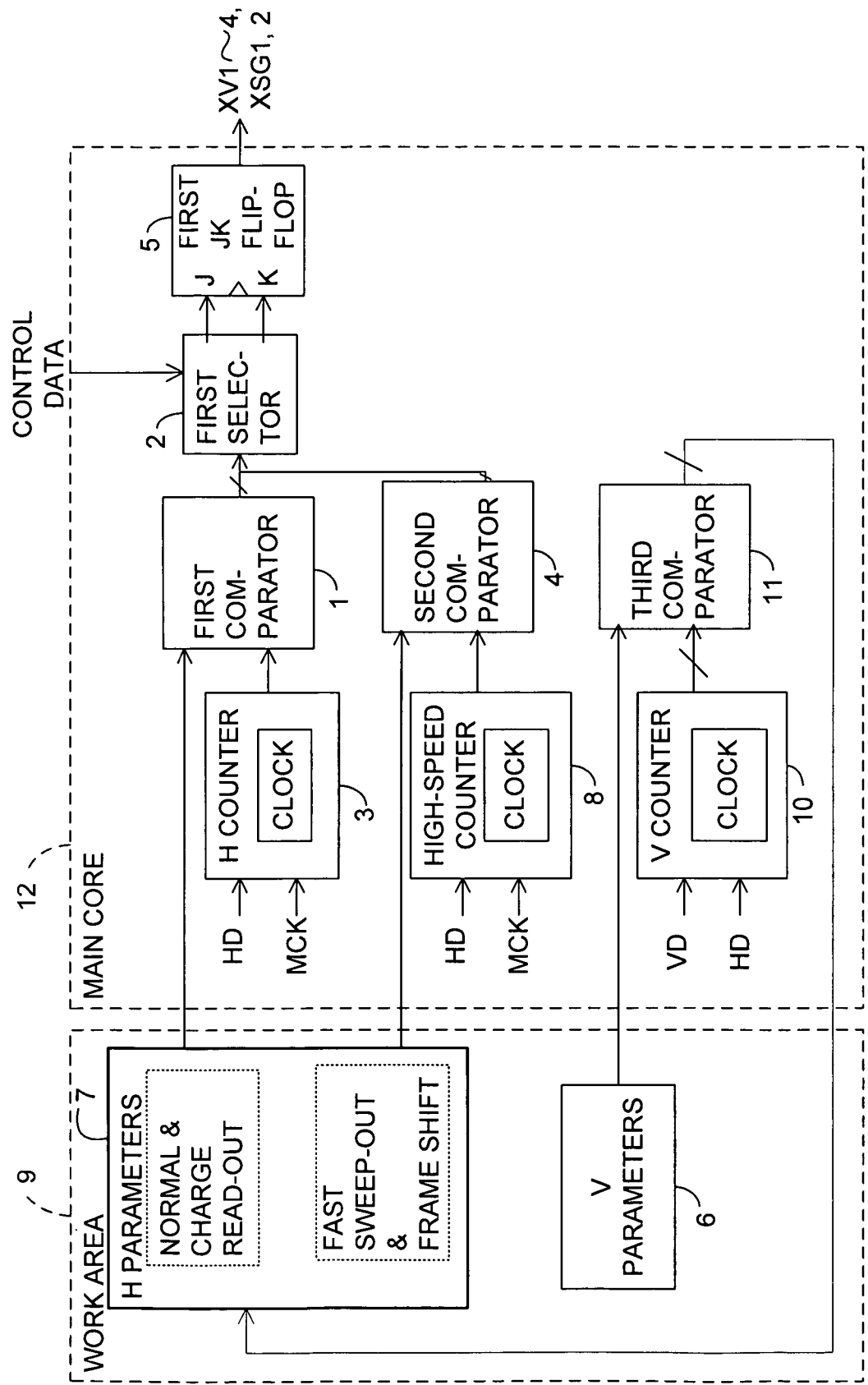
FIG. 1 is a schematic block diagram showing a timing generator which is an example of timing signal generation apparatuses according to an embodiment of the present invention.
Figure 2:
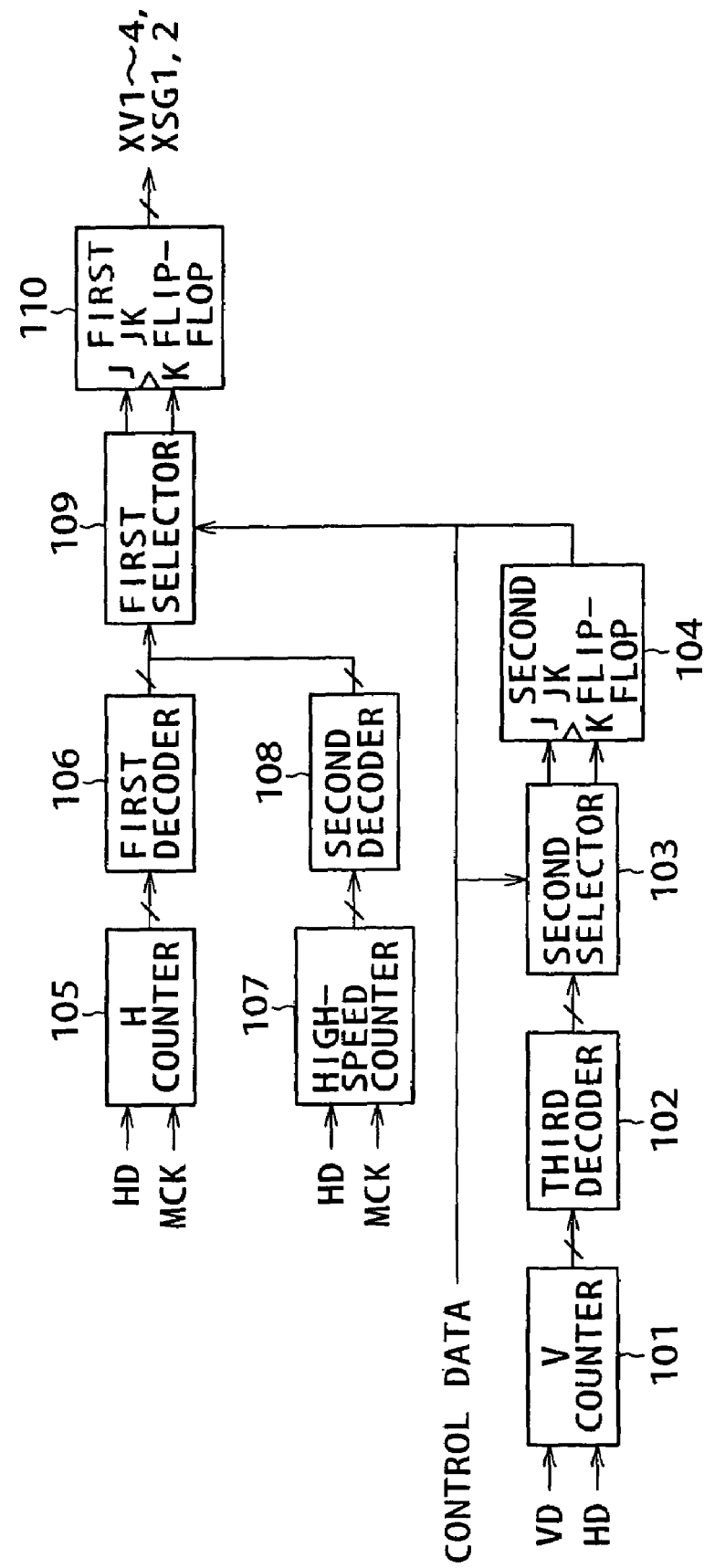
FIG. 2 is a schematic block diagram showing a conventional timing generator.

A preferred embodiment of the present invention will be described in detail by referring to the accompanying drawings in the following. FIG. 1 is a schematic block diagram showing a timing generator which is an example of timing signal generation apparatuses according to a preferred embodiment of the present invention. The timing generator shown here is comprised of a main core 12 which is standardized in a hardware description language level prior to a logic synthesis in its LSI circuit design, and a work area 9 for describing numeric data indicating respective changing points in timing pulses in respective vertical transfer modes such as an ordinal transfer, a high-speed sweep out transfer, a charge read-out transfer and a frame shift transfer timings.

Here, the work area is comprised of a V parameter 6 and an H parameter 7.

Further, the main core is comprised of: a V counter 10 which carries out counting triggered by a vertical synchronizing signal VD and also using a horizontal synchronizing signal HD as a clock; a third comparator 11 for comparing a count value of the V counter and a numeric data stored in the V parameter; an H counter 3 which carries out counting triggered by a horizontal synchronizing signal HD and also using a master clock signal MCK as a clock; a first comparator 1 for comparing a count value of the H counter and a numeric data relating to the normal transfer and charge read-out transfer included in the numeric data stored in the H parameter; a high speed counter 8 which, likewise the H counter, carries out counting triggered by the horizontal synchronizing signal HD and also using the master clock signal MCK as a clock; a second comparator 4 for comparing a count value of the high speed counter and a numeric data relating to the high-speed sweep out transfer and the frame shift transfer which are included in the numeric data stored in the H parameter; a first selector for selecting between the timing pulses from the first comparator and the second comparator in response to a control data from a microcomputer and outputting a leading edge pulse and/or a trailing edge pulse; and a first JK flip flop 5 for outputting timings of XV 1~4 and XSG 1~2 for driving the solid-state image pick-up device on the basis of the leading edge pulse and/or the trailing edge pulse from the first selector.

In the following, an operation of the timing generator having the aforementioned arrangement will be described. That is, an exemplary operation of the timing signal generation apparatus according to the embodiment of the present invention will be described. In the first, by the third comparator, a count value of the V counter which carries out counting as triggered by the vertical synchronizing signal VD and also using the horizontal synchronizing signal HD as a clock is compared with a numeric data stored in the V parameter according to a HD unit per vertical transfer mode, then a timing pulse in accordance with the count value of the V counter is generated. By way of example, the timing pulse from the third comparator is used to control a sequential operation in a respective vertical transfer mode such as the normal transfer, charge read-out transfer, fast sweep out transfer and frame shift transfer of the H parameter in the work area.

In the next, by the first comparator, a count value of the H counter which carries out counting as triggered by the horizontal synchronizing signal HD and also using a master clock signal MCK as a clock is compared with a numeric data stored in the H parameter according to a MCK unit in a respective vertical transfer mode of the normal transfer and the charge read-out transfer, then a timing pulse is generated in accordance with the count value of the H counter. Likewise, by the second comparator, a count value of the high-speed counter which carries out counting as triggered by the horizontal synchronizing signal HD and also using the master clock signal MCK as the clock is compared with a numeric data stored in the H parameter according to a MCK unit per vertical transfer mode of the fast sweep out transfer and the frame shift transfer, then a timing pulse is generated in accordance with the count value of the high-speed counter.

The timing pulses from the first comparator and the second comparator are selected in response to a control signal from the microcomputer, and outputted as a leading edge pulse and/or a trailing edge pulse via the first selector. The leading edge pulse and/or the trailing edge pulse outputted from the first selector are outputted from the first JK flip flop as timing signals XV 1~4, XSG 1~2 to the solid-state image pick-up device.

In the timing generator according to the embodiment of the present invention, it is enabled to modify information such as the driving timing, the vertical transfer mode and the like readily and in a short period of time simply by modifying the numeric data only in the work area, thereby realizing a substantial improvement in the design efficiency thereof That is, a conventional phase of a logic design which is allowed only for a skilled design engineer to deal with is no more needed, and thus even in the case of a logic circuit having multiple modes and complicated timings, it is enabled to carry out a logic circuit design by simply inputting a timing operation specification, thereby substantially improving the design efficiency thereof.

The presently disclosed embodiment is therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A timing signal generation apparatus comprising:
 a work area from which parameters are outputted in response to a control data; and
 a main core to which said parameters are inputted:
 wherein, into said work area, a first parameter and a second parameter are described; and said main core comprises:
- a first counter for counting a first reference clock as triggered by each pulse of a vertical synchronizing signal,
- a second counter for counting a second reference clock as triggered by each pulse of a horizontal synchronizing signal at the time of a first drive mode,
- a third counter for counting a third reference clock as triggered by each pulse of a the horizontal synchronizing signal at the time of a second drive mode,
- a first comparator for comparing a count value in said first counter with said first parameter and outputting a first control pulse in accordance with said count value of said first counter,
- a second comparator for comparing a count value in said second counter with said second parameter and outputting a second control pulse in accordance with said count value of said second counter,
- a third comparator for comparing a count value in said third counter with said second parameter and outputting a third control pulse in accordance with said count value of the third counter, and
- an output unit for selectively outputting said second control pulse or said third control pulse in response to the control data supplied from external.

2. The timing signal generation apparatus according to claim 1, wherein said output means is controlled by a microcomputer.

* * * * *